(12) United States Patent
Jehannet et al.

(10) Patent No.: US 9,340,183 B2
(45) Date of Patent: May 17, 2016

(54) SUPPORT DEVICE AND ASSEMBLY FOR A WINDSCREEN-WIPER BLADE

(75) Inventors: Jean-Pierre Jehannet, La Verriere (FR);
Nathalie Baticle, La Verriere (FR)

(73) Assignee: Valeo Systèmes d'Essuyage, La Verriere (FR)

(*) Notice: Subject to any disclaimer, the term of this patent is extended or adjusted under 35 U.S.C. 154(b) by 1565 days.

(21) Appl. No.: 12/296,839

(22) PCT Filed: Apr. 23, 2007

(86) PCT No.: PCT/EP2007/053955
§ 371 (c)(1),
(2), (4) Date: Oct. 10, 2008

(87) PCT Pub. No.: WO2007/122218
PCT Pub. Date: Nov. 1, 2007

(65) Prior Publication Data
US 2009/0049638 A1    Feb. 26, 2009

(30) Foreign Application Priority Data
Apr. 25, 2006  (FR) ...................................... 06 03676

(51) Int. Cl.
*B60S 1/38* (2006.01)
*B65D 85/00* (2006.01)
*B60S 1/04* (2006.01)

(52) U.S. Cl.
CPC ............... *B60S 1/3848* (2013.01); *B65D 85/00* (2013.01); *B60S 1/0491* (2013.01); *B60S 2001/3843* (2013.01); *B65D 85/54* (2013.01); *B65D 2585/6885* (2013.01); *Y10T 29/49945* (2015.01)

(58) Field of Classification Search
CPC .......... B65D 2585/6885; B65D 75/22; B65D 75/225; B65D 75/36; B65D 75/566; B65D 43/162; B65D 59/04; B65D 85/54; B65D 85/00; B65D 85/68; B65D 85/08; B65D 81/05; B60S 1/0491; B60S 1/3848; Y10T 29/49945

USPC ........... 15/250.001, 250.361, 257.01, 250.31; 206/1.5, 349, 335, 471, 470, 483, 482, 206/443, 427, 480, 461, 467, 469
See application file for complete search history.

(56) References Cited

U.S. PATENT DOCUMENTS

| | | | |
|---|---|---|---|
| 5,023,972 A * | 6/1991 | Bauer et al. | 15/250.453 |
| 6,779,661 B1 | 8/2004 | Kotlarski et al. | |
| 2005/0252812 A1 | 11/2005 | Lewis | |
| 2006/0081493 A1* | 4/2006 | Park | 206/470 |

FOREIGN PATENT DOCUMENTS

| | | | |
|---|---|---|---|
| DE | 23 26 093 A1 | | 12/1974 |
| EP | 1 512 593 A | | 3/2005 |
| FR | 2 133 247 A | | 11/1972 |
| FR | 2843368 | * | 2/2004 |
| FR | 2 859 713 A1 | | 3/2005 |
| FR | 2 875 486 A | | 3/2006 |

OTHER PUBLICATIONS

International Search Report w/translation from PCT/EP2007/053955 dated Jul. 13, 2007 (6 pages).

* cited by examiner

*Primary Examiner* — Gary Graham
(74) *Attorney, Agent, or Firm* — Osha Liang LLP (57) ABSTRACT

The invention relates to a support device for a windscreen-wiper blade comprising a wiping strip (3) and a structure element (8), the device having an open section (5a) designed for receiving the wiping strip (3) of the windscreen-wiper blade (2), to allow it to be held substantially flat.
According to the invention, the support device (1) comprises,
means (7) for positioning the windscreen-wiper blade (2) in the support device (1),
means (6) for attaching the windscreen-wiper blade (2) in the support device (1), said attachment means being in the form of at least one attachment point (6a) acting on the structure element (8) of the windscreen-wiper blade (2).
The invention also relates to a support assembly for windscreen-wiper blades comprising two support devices, a packaging integrating a support device or assembly and a method of mounting a windscreen-wiper blade in a support device.

23 Claims, 8 Drawing Sheets

# SUPPORT DEVICE AND ASSEMBLY FOR A WINDSCREEN-WIPER BLADE

The invention relates to a support device for a windscreen-wiper blade, designed to be used, in particular, for off-the-shelf sales in shops or for transporting windscreen-wiper blades from the manufacturing location to the packaging location or to the location for assembly on a vehicle.

The invention also relates to a support assembly for a pair of windscreen-wiper blades, for example for a vehicle windscreen-wiper blade replacement kit.

The present invention also relates to a method of mounting a windscreen-wiper blade in a support device according to the invention.

In a more general manner, the invention also relates to packaging for a windscreen-wiper blade comprising a support device according to the invention.

For off-the-shelf sales, standard windscreen-wiper blades are generally packaged in blister packs or in cardboard packaging, for example a box, in a generally longilinear and linear shape. Indeed, the linear shape of these blades allows for simple, linear packaging, the bulk of which is not necessarily greater than the dimensions of the windscreen-wiper blade.

For flat windscreen-wiper blades, known as "flat-blade" wipers, the packaging proves to be more problematic than in the case of standard windscreen-wiper blades due to their generally longilinear and curved shape. Patents EP11194878 A and WO2005/108176 A, for example, can be consulted, which explain in detail the structure of these "flat blade" windscreen-wiper blades.

The structure of a "flat-blade" windscreen wiper will not be described here in detail and it is recommended to refer to the documents mentioned above.

A first solution for packaging "flat-blade" windscreen-wiper blades is provided in patent WO2001/30619 A. This document describes a longitudinally shaped packaging medium into which the windscreen-wiper blade is inserted longitudinally through one of the ends of the medium. The medium has either notches or lugs into which complementary shapes provided on the windscreen-wiper blade can slide.

However, despite the fact that the notches or lugs on the medium hold the windscreen-wiper blade flat when it is completely inserted therein, it should be mentioned that it is not easy to insert the windscreen-wiper blade into the medium and it requires a certain amount of time due to the fact that the forces exerted on the windscreen-wiper blade tend to cause it to return to its initial curved position.

Another solution for packaging "flat-blade" windscreen-wiper blades is presented in patent EP 1,512,593 A, which describes a longitudinal support element equipped with locking means at its centre for holding the windscreen-wiper blade connector, and support means at each end disposed laterally on either side of the medium for holding the windscreen-wiper blade flat in cooperation with the locking means. Although interesting, a major drawback of this device is the large number of existing connectors. Indeed, it means manufacturing a support element with locking means adapted to each connector. This requirement makes this solution difficult to industrialise and poorly suited for current standardisation issues.

A third solution is provided in patent WO2005/026005 A, which suggests shaping the windscreen-wiper blade packaging in a particular fashion. According to this document, the packaging is made up of a cardboard backing covered on the front by a blister pack, which comprises means for supporting the windscreen-wiper blade and has a curved shape adapted to the curved shape of the windscreen-wiper blade.

Furthermore, it should be noted that in the previously described solutions, there is a risk of damaging the wiping strip of the windscreen-wiper blade, which is very detrimental for the end user.

In the context of a general policy of reducing the amounts of packaging used and the bulk of products on the shelf, this solution, while aesthetically pleasing, is not entirely satisfying.

The invention therefore aims to find a packaging solution that can be applied to "flat-blade" windscreen-wiper blades but also to standard windscreen-wiper blades, having reduced bulk and solving the problems of the prior art. Furthermore, the invention also aims to find a standardisable packaging solution which is suitable for the maximum number of windscreen-wiper blade models.

For this purpose, the invention provides a support device for a windscreen-wiper blade, the device having an open section designed to receive the windscreen-wiper blade, for holding it in a substantially flat position. According to the invention, the support device comprises, means for positioning the windscreen-wiper blade in the support device, attachment means, said attachment means being in the form of points for attaching the windscreen-wiper blade to the device, distributed over the support device and acting on at least one element of the structure of the windscreen-wiper blade.

The invention also provides a method for mounting a windscreen-wiper blade in a support device, and packaging for a windscreen-wiper blade.

According to other characteristics of the invention,

The attachment points are disposed on either side of the opening of the open section of the support device and they act in pairs on the structure element of the windscreen-wiper blade.

The structure element on which the attachment points act is a spine of the windscreen-wiper blade.

The positioning means are disposed on either side of the opening of the open section of the support device and they contribute in pairs to supporting the windscreen-wiper blade while it is being positioned.

The support device takes the form of a rail in a generally longitudinal shape, the positioning means and the attachment means being formed integral with the rail.

The rail is manufactured by plastic injection or by extrusion.

The positioning means are manufactured by extrusion with the rail, and the attachment means are locking means designed to be mounted on the rail.

The locking means comprise at least one uncapping tab to facilitate the dismantling of the windscreen-wiper blade.

The support device comprises, inside the open section, means for protecting the wiping strip of the windscreen-wiper blade.

The means of protecting the wiping strip comprise walls formed integral with the rail of the support device.

The positioning means are disposed at the ends of the support device.

The windscreen-wiper blade attachment points are disposed on either side of the windscreen-wiper blade connector in the longitudinal direction of the windscreen-wiper blade.

The support device has, on either side of the connector, an alternation of positioning means and attachment means.

The support device comprises means for stabilising the support device on a flat surface, disposed on at least one outer side of the open section of the support device.

The stabilising means are formed integral with the rail of the support device,

The attachment means contain the stabilising means.

The positioning means and the attachment means are independent from each other.

The invention also provides a support assembly for a windscreen-wiper blade comprising two support devices.

The first support device of the support assembly comprises first assembly means cooperating, due to their complementary shape, with second assembly means of the second support device.

The first and second assembly means are made up of a lug/notch pair.

The first and second assembly means cooperate by means of a buttonhole system

Each of the support devices comprises a median axis in the longitudinal direction of the windscreen-wiper blade and the median axes of the two support devices, once assembled, are staggered in relation to each other.

The invention also relates to a support device designed to hold, in a predetermined profile, a windscreen-wiper blade having an element that supports the wiping strip, the device comprising two means for supporting or positioning the windscreen-wiper blade on the support device; and means for attaching the windscreen-wiper blade to the support device, in which the blade attachment means are designed to cooperate with the support element of the wiping strip.

Further characteristics and advantages of the invention will become apparent from reading the following detailed description made in reference to the appended drawings, wherein.

In the rest of the description, the directions longitudinal, vertical and transversal will be used, represented in the figures by the trihedron L, V, T, which is fixed in relation to the windscreen-wiper arm.

Figures 1, 2:
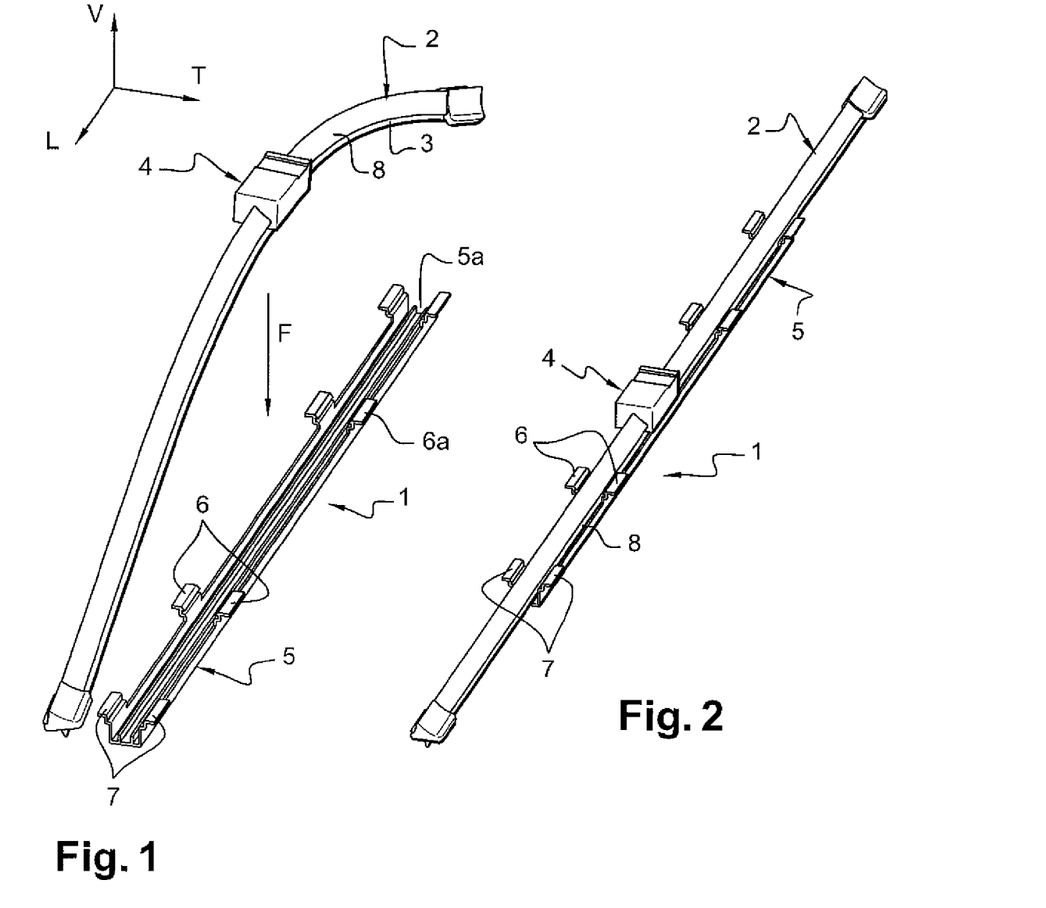
FIG. 1 shows a perspective view of a support device according to the invention having a windscreen-wiper blade in the mounted position on the support device.
FIG. 2 shows a similar view to FIG. 1 in which the windscreen-wiper blade is mounted in the support device.

The orientation front-to-back will also be adopted as being the longitudinal left-to-right direction according to FIG. 1.

Hereinafter, identical, analogous or similar elements will be designated by the same reference numbers.

FIGS. 1 and 2 show a support device 1 for a windscreen-wiper blade 2 of "flat-blade" type with a curved shape equipped with a wiping strip 3. The windscreen-wiper blade 2 extends longitudinally and comprises, disposed approximately at its middle, a connector 4 designed to allow the connection of the windscreen-wiper blade 2 to a windscreen-wiper arm generally connected to a driving motor.

The support device 1 is presented in the form of a rail 5, also longitudinal in shape, having a U-shaped open section 5a. The windscreen-wiper blade 2 is designed to be inserted in the open section 5a to be held there flat. The rail 5 is a rigid part, for example made from plastic.

The support device 1 additionally comprises attachment means 6 and positioning means 7 designed to ensure that the windscreen-wiper blade is held flat once inserted in the device. Thus, the rail 5 comprises positioning means 7 and attachment means 6, said attachment means being an integral part of the rail or being added thereto.

More specifically, the attachment means 6 are distributed on the support device 1 at attachment points 6a, at least at one attachment point 6a. These attachment points are distributed in a specific manner on the support device 1 to ensure that the windscreen-wiper blade is effectively supported therein.

The embodiment of the invention described comprises several attachment points 6a disposed on either side of the opening of the open section 5a of the support device 1, which act in pairs on the windscreen-wiper blade. More specifically, the attachment means 6 act on a structure element 8 of the windscreen-wiper blade. This structure element is, for example, made up of one or more spines 8 of the windscreen-wiper blade.

The attachment points 6a are distributed along the longitudinal direction of the rail 5 on either side of the connector 4, once the windscreen-wiper blade is assembled in the device, to ensure optimum support of the windscreen-wiper blade 2.

Since the attachment means 6 do not act on the connector 4, it is easy to understand that the device according to the invention can be used for any windscreen-wiper blade, regardless of the type of connector it includes. This is a particular advantage in view of the standardisation of the support device 1.

The positioning means 7 are also disposed on either side of the opening of the open section 5a of the support device 1 and they contribute in pairs to supporting the windscreen-wiper blade 2. In this embodiment of the invention, the positioning means 7 do not, strictly speaking, provide the attachment of the windscreen-wiper blade, but contribute to its guidance and correct positioning in the support device 1. Indeed, they prevent the windscreen-wiper blade 2 from twisting by ensuring its stable support.

This arrangement of the means for attaching the windscreen-wiper blade in the support device allows vertical and transversal blocking of the windscreen-wiper blade in the support device while allowing longitudinal movement of the windscreen-wiper blade.

In FIG. 1, the windscreen-wiper blade 2 is disposed above the open section 5a of the support device 1 in mounted position. To proceed with mounting the windscreen-wiper blade 2 in the support device 1, the user exerts pressure on the windscreen-wiper blade 2 in the direction of the arrow F parallel to attachment points 6a distributed over the support device 1. The user then presses against the attachment means 6 in order to insert and attach the windscreen-wiper blade in the open section 5a of the rail 5. The windscreen-wiper blade 2 is then held flat in the support device 1 as shown in FIG. 2. The windscreen-wiper blade 2 is then fixed in the support device 1 at the level of the attachment points 6a, guided at the level of the positioning means and free at its ends.

Figure 3:
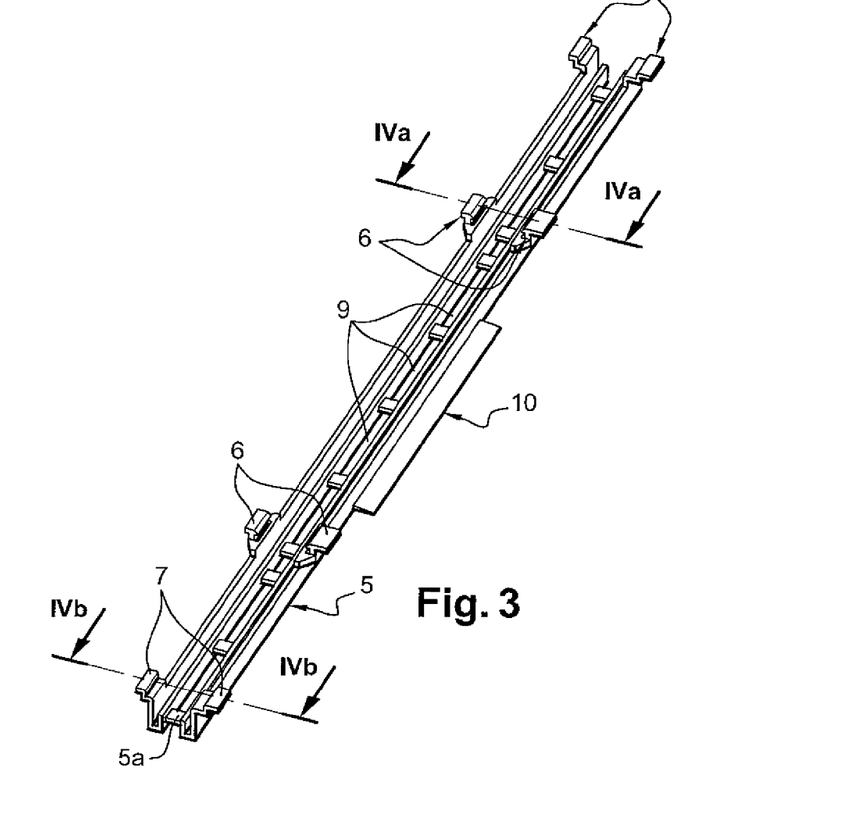
FIG. 3 shows a perspective view of a first embodiment of a support device according to the invention.

FIG. 3 shows a first embodiment of the support device 1 wherein the rail 5 of the support device 1 is made from plastic material using plastic injection technology. By means of this technology, the attachment means 6 and the positioning means are manufactured directly during injection so as to be formed integral with the rail 5. As shown in FIG. 3, the bottom of the open section 5a has transversal areas 9, in this case rectangular, made during plastic injection and allowing a very noticeable reduction of the material used.

The positioning means 7 are disposed in pairs on the ends of the rail 5 of the support device 1 and the attachment means 6 are distributed in pairs along the support device 1.

In addition, according to another aspect of the invention, the rail comprises means 10 for stabilising the support device 1 on a flat surface, thus making it possible to keep the support device 1 in an operational position for inserting a windscreen-wiper blade.

The stabilisation means 10 take, in the example shown, the shape of a plastic tab disposed on an outer side of the support device and on the face opposite the opening of the open section 5a.

In the embodiment of the invention shown, the stabilisation means 10 are formed integral with the rail, but it is also possible to provide for them to be attached to the latter.

The stabilisation means 10 are shown on a single side of the support device, but it is also possible to place them on both sides of the support device if necessary, in particular in the case of a considerably long support device.

The stabilisation means 10 allow, among other advantages, the support devices 1, with or without the windscreen-wiper blades 2, to be stacked on top of one another when they are being transported in containers towards the locations where they are packaged with a view to selling them off the shelf or to the locations where they are installed on the vehicle.

In a general manner and depending on the vehicle model, it is often necessary, in order for the user to obtain wiping of his/her vehicle's windscreen in accordance with the required standards, to have a first windscreen-wiper blade for the driver side (DS) and a second windscreen-wiper blade for the passenger side (PS).

The support device 1 shown here is compatible with the windscreen-wiper blades used both for the driver side and for the passenger side, which is particularly advantageous and ensures true savings when producing the support device. The DS and PS blades are then differentiated, for example, by marking the support device 1 or by assigning a specific colour to the relevant side (different colours for the DS and PS versions).

Figure 4A:
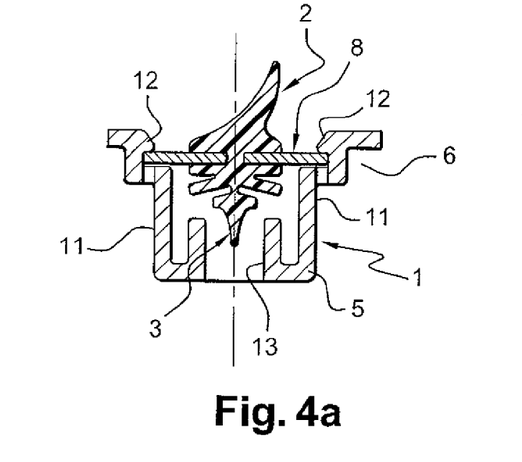
FIGS. 4a and 4b show cross-section views of the support device, according to the axes IVa-IVa and IVb-IVb in FIG. 3, in which a windscreen-wiper blade is mounted.
Figure 4B:
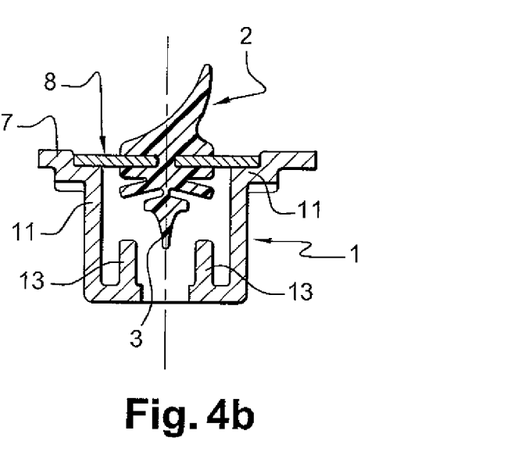

Cross-section views along the axes IVa-IVa and IVb-IVb are provided as FIGS. 4a and 4b, providing detailed views of the attachment means 6 and the positioning means 7.

In addition, for better understanding of the mode of action of the attachment means 6 and the positioning means 7, the support device in FIGS. 4a and 4b is show after the insertion of a windscreen-wiper blade 2 therein.

FIG. 4a therefore shows a cross-section view, at the level of the attachment means 6, wherein the support device 1 of FIG. 3 integrates a windscreen-wiper blade 2.

The windscreen-wiper blade 2 has two spines 8 that extend on either side of the longitudinal axis of the windscreen-wiper blade 2. The spines 8 rest against the top ends of the lateral walls 11 of the rail 5. The spines 8 are held locally in the support device 1 at the level of the attachment points 6a by means of clips 12 formed integral with the rail 5. The shape and the number of clips 12 varies as required, which makes it possible to obtain stable, effective attachment of the windscreen-wiper blade 2 in the support device since the attachment means 6 act directly on a structure element of the windscreen-wiper blade 2.

FIG. 4b also shows, in a cross-section view, the positioning means 7 of the windscreen-wiper blade 2 inserted in the support device 1. The positioning means 7 extend at the level of the top ends of the lateral walls 11 of the rail 5 and frame the spines 8 of the windscreen-wiper blade 2. They therefore allow the spines 8 to be guided and rest against the support device 1.

The length of the support device is adapted to each type of windscreen-wiper blade so that the spines of the windscreen-wiper blade rest against the lateral walls 11 and are framed at their ends by the positioning means 7. This is due to the spring effect of the spines of the windscreen-wiper blade, which in this case is a "flat-blade" windscreen-wiper blade.

In this embodiment of the invention and according to one aspect of the invention, the attachment means 6 and the positioning means 7 are independent and act differently on the windscreen-wiper blade when it is inserted and supported in the support device 1.

According to the invention and as can be seen in FIGS. 4a et 4b, the support device also comprises means 13 of protecting the wiping strip 3 of the windscreen-wiper blade. These protection means are presented in the form of vertical walls 13 which start at the bottom of the rail 5 and are formed integral with the latter.

These protection walls 13 make it possible to avoid damaging the strip by contact when transporting the windscreen-wiper blade in the support device 1.

Figure 5:
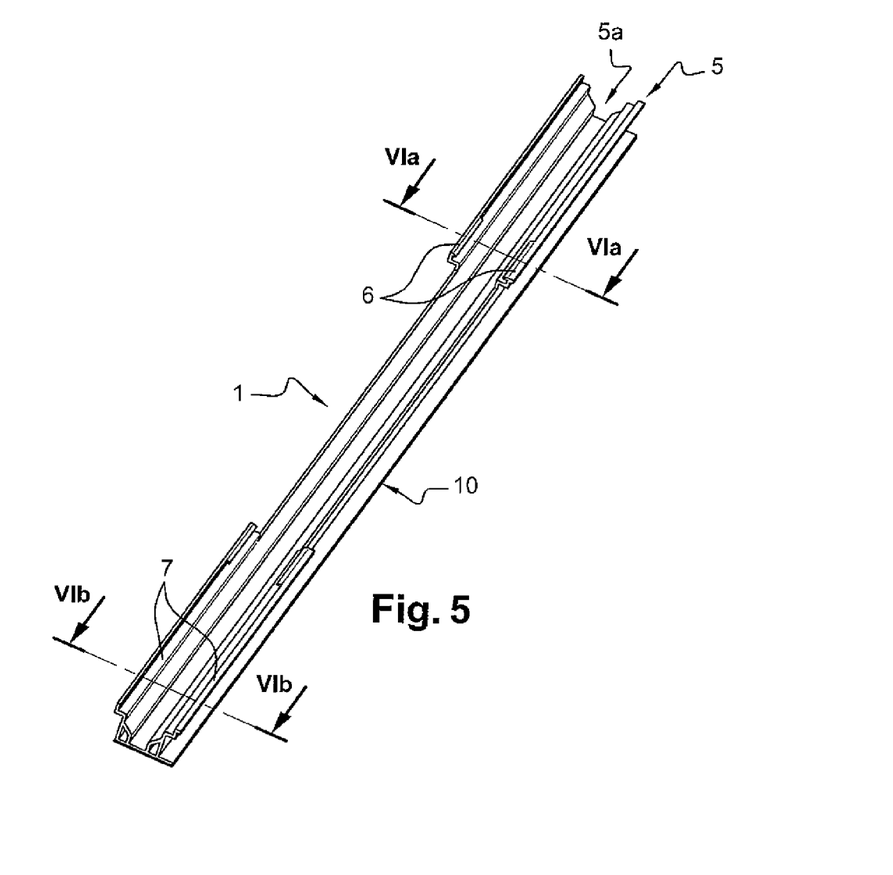
FIG. 5 shows a perspective view of a second embodiment of a support device according to the invention.
Figure 6A:
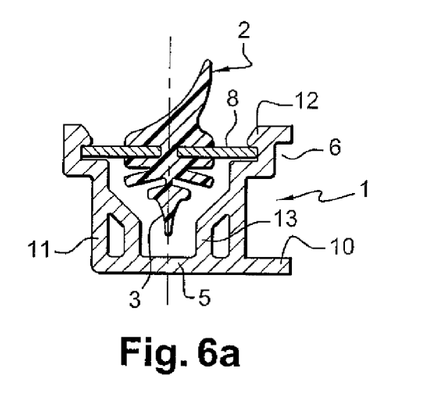
FIGS. 6a and 6b show cross-section views of the support device, according to the axes VIa-VIa and VIb-VIb in FIG. 5, in which a windscreen-wiper blade is mounted.
Figure 6B:
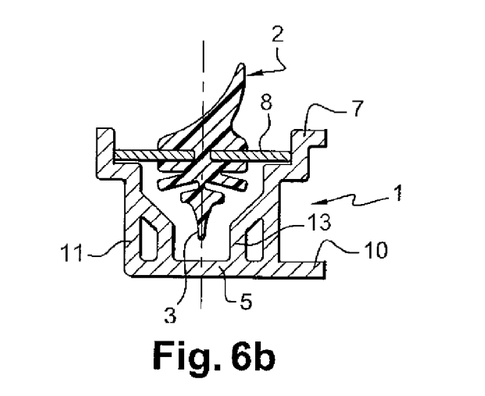

FIGS. 5, 6a and 6b show a second embodiment of the support device wherein the support device 1 is made by extrusion technology. The use of this technology makes it possible directly to manufacture the rail 5 equipped with its positioning means 7 and its attachment means 6. Localised cut-outs in the rail make it possible to obtain the space required for the connector of the windscreen-wiper blade once the latter is inserted in the support device.

FIGS. 6a and 6b show cross-section views along lines to VIa-VIa and VIb-VIb of FIG. 5 and show details of the action of the attachment means 6 (FIG. 6a) and positioning means 7 (FIG. 6b) at the level of the windscreen-wiper blade and, more specifically, at the level of the spines 8 of the latter.

Given that the description of FIGS. 6a and 6b is similar to that of FIGS. 4a and 4b, it will not be repeated in detail.

In FIG. 6a, the attachment means 6 of the spines 8 of the windscreen-wiper blade 2 are also made in the form of clips 12.

These clips 12 act directly on the spines 8 of the windscreen-wiper blade which are resting against the top ends of the lateral walls of the rail 5.

In FIG. 6b, which shows the positioning means 7, the spines 8 rest against the top ends of the lateral walls 11 and are guided and framed at their ends by the positioning means 7.

In this embodiment of the invention, the rail 5 also comprises a stabilisation tongue 10, made by extrusion during the extrusion of the rail 5. The stabilisation tongue 10 in this case extends along the entire length of the support device 1.

As in the preceding embodiment of the invention, this support device 1 is compatible with the DS and PS windscreen-wiper blades, which is very advantageous in terms of standardisation. However, it is necessary to provide means that allow the end customer to differentiate the driver and passenger windscreen-wiper blades.

It is possible to consider placing a pictogram identifying the driver side (DS) and the passenger side (PS) or the use of different colours for the DS and PS versions, on a specific zone of the attachment means 6, for example, at the level of an extension of a wall connected to the clip 12. This extension can, for example, be pre-cut and it is then a case, for a support device having two extensions, each with a different pictogram, of breaking the desired extension. Thus, for a driver side windscreen-wiper blade, the pre-cut extension bearing the indication DS will be broken, leaving only the extension bearing the PS indication, and vice-versa.

Furthermore, protection walls 13 of the wiping strip 3 are also shown in this embodiment of the invention. These protection walls 13 ensure, in addition to protection of the wiping strip, that the support device 1 is rigidified due to their arrangement. Indeed, in the present case, the protection walls 13 start at the bottom of the rail 5 and meet the lateral walls 11 of the rail 5, thus creating reinforcements.

It may also be desirable to add an outer scraping lip to the bottom of the rail 5 of the support device 1, when the latter is to be used as a strip-protecting element during long-term parking, making it possible to defrost the vehicle's windscreen.

As for FIGS. 7 to 9c, they show a third embodiment of the invention, wherein the rail 5 of the support device 1 and the positioning means 7 are made, for example, by extrusion.

Figure 8A:
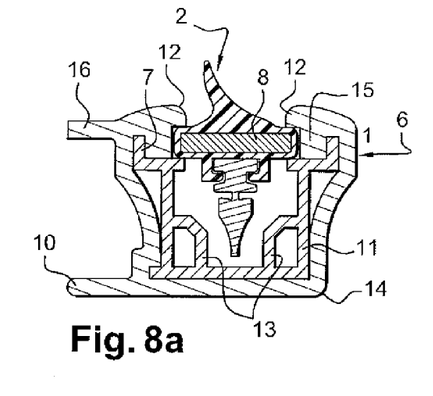
FIG. 8a shows a cross-section view of the support device, according to the axis a-a in FIG. 7, in which a first type of "flat-blade" windscreen-wiper blade is mounted.
Figure 8B:
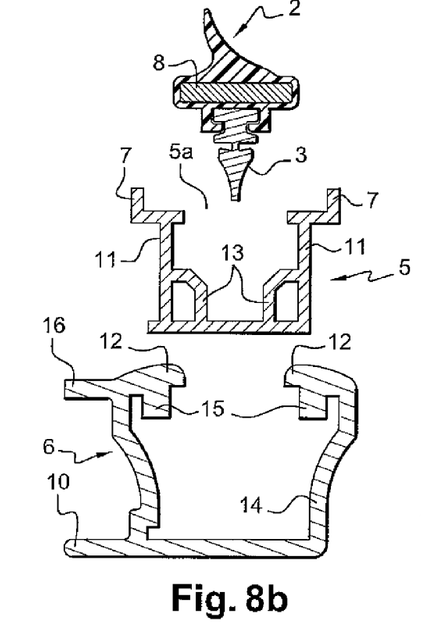
FIG. 8b shows an exploded view of FIG. 8a showing the assembly of the windscreen-wiper blade and the support device.
Figure 8C:
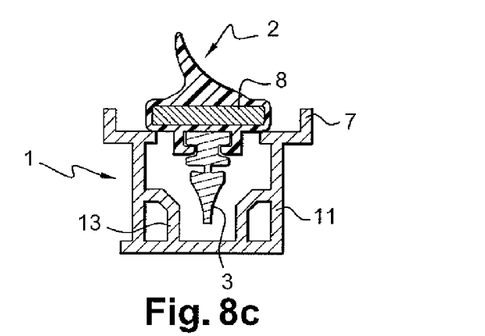
FIG. 8c shows a cross-section view of the support device, according to the axis c-c in FIG. 7, in which a first type of "flat-blade" windscreen-wiper blade is mounted.

FIGS. 8 (a to c) and 9 (a to c) relate to two models of "flat-blade" windscreen-wiper blades. One is a traditional "flat-blade" (FIG. 9) in which the spines are inserted in the structure of the windscreen-wiper blade, and the other (FIG. 8) is a so-called economic "flat-blade" comprising a single spine overmoulded with the aerodynamic deflector, also called "spoiler".

Figure 7:
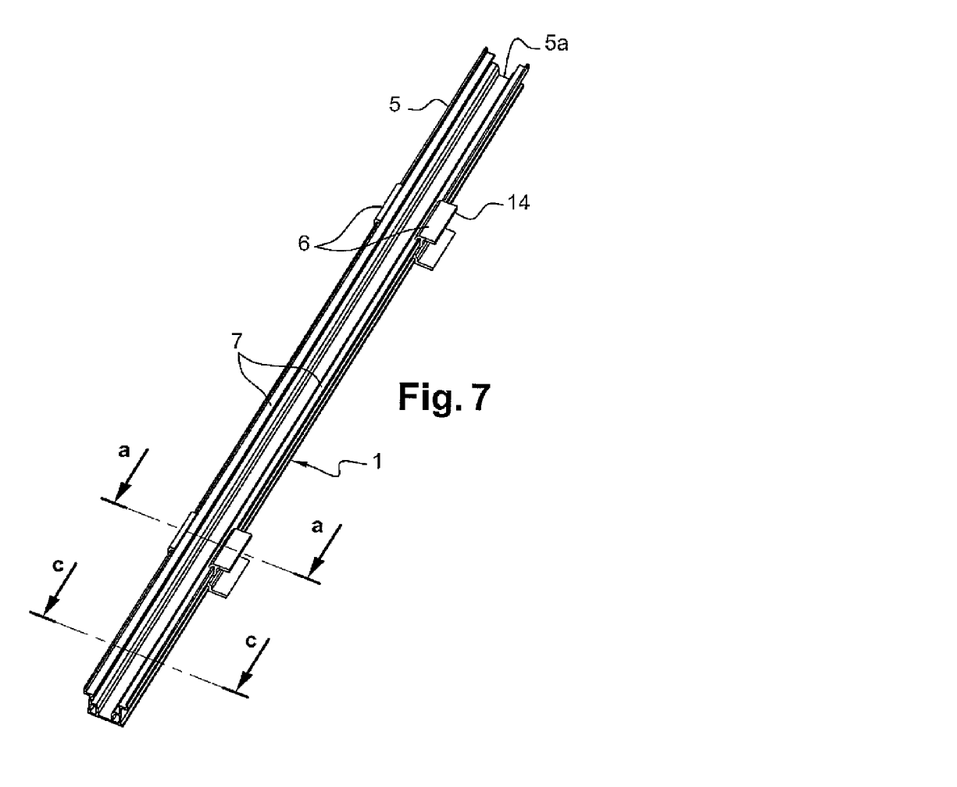
FIG. 7 shows a perspective view of a third embodiment of a support device according to the invention.

Unlike the preceding embodiment of the invention, the rail 5 is made by integrating the positioning means 7, which extend longitudinally on either side of the opening of the open section 5a of the rail 5, on the entirety of the latter.

The rail 5, equipped with positioning means 7, is made in a single go, for example by extrusion, and its structure allows it to be used for any type of "flat-blade" windscreen-wiper blades, equally for DS and PS windscreen-wiper blades. This rail 5 is also suitable for windscreen-wiper blades of any length, since it can be cut it to the desired length.

The attachment means 6 act in pairs, taking the form of locking means 14 designed to lock onto the rail 5. These locking means 14 are specific for a given type of windscreen-wiper blade and can be installed on the desired locations of the rail 5, according to the length of the windscreen-wiper blade to be positioned. The locking means can be made by extrusion or by injection.

Figure 9A:
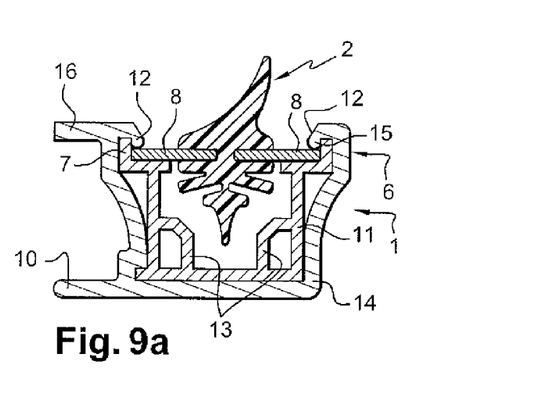
FIG. 9a shows a cross-section view of the support device, according to the axis a-a in FIG. 7, in which a second type of "flat-blade" windscreen-wiper blade is mounted.

The attachment means 6 are shown in greater detail in FIGS. 8a and 9a, which show cross-section views according to line a-a of FIG. 7. The attachment means 6 are made in the form of locking means 14 consisting, in the presented embodiment of the invention, of a hook or elastic fastener with a generally U-shaped open section intended to be positioned around the rail 5. The fastener 14 is arranged around the rail 5 so as to leave the opening of the open section 5a free for inserting the windscreen-wiper blade 2. The fastener 14 is mounted manually on the rail 5 by locking onto the rail. This elastic locking is ensured by the cooperating shapes of the walls forming positioning means 7 of the windscreen wiper 2 of the rail and the retaining means 15 which the fastener 14 includes.

Thus, once installed, the fastener 14 is held in position elastically on the rail 5 of the support device 1.

The locking means are, for example, manufactured using an extrusion technique, the die produced during extrusion then being cut to the desired dimensions so as to form the locking means 14.

In FIG. 8a, where the windscreen-wiper blade 2 inserted in the support device 1 has a single overmoulded spine, the fastener 14 is retained on the rail 5 by means of retaining means 15. These retaining means are made in the form of blocks 15 supporting the attachment clips 12.

In FIG. 9a, where the windscreen-wiper blade 2 inserted in the support device 1 has two overmoulded spines, the fastener 14 is retained on the rail 5 by means of retaining means 15 which, in this example, are formed by the clips 12.

In addition, the rail 5, which is common to all types of "flat-blade" windscreen-wiper blades, comprises protection walls 13 of the wiping strip 3 which, in addition to protecting the wiping strip, ensure that the support device 1 is rigidified due to their arrangement between the bottom of the rail 5 and the lateral walls 11 thereof.

Furthermore, as shown in FIGS. 8a and 9a, the fastener 14 comprises means 10 for stabilising the support device on a flat surface. These stabilisation means are formed by a tongue 10 positioned on the lateral side of the fastener and are formed integral with the inner part of the fastener 14.

The tongue 10 is made on a single side starting from the bottom of the fastener 14 but, if required, it is possible to provide a second stabilisation tongue on the other side of the fastener 14.

According to the invention, the fastener 14 also comprises an unclipping tongue or an attachment tab 16 arranged opposite the stabilization tongue 10, which makes it easier to remove and dismantle the windscreen-wiper blade 2 when it is inserted and fixed in the support device 1. For this purpose, the user who has a support device 1 equipped with a windscreen wiper 2 presses on the unclipping tab 16. This has the effect of separating at least one of the clips 12 from the means 6 for attaching the windscreen wiper 2 in the rail 5, allowing the windscreen wiper 2 to be released without any particular effort.

Figure 9B:
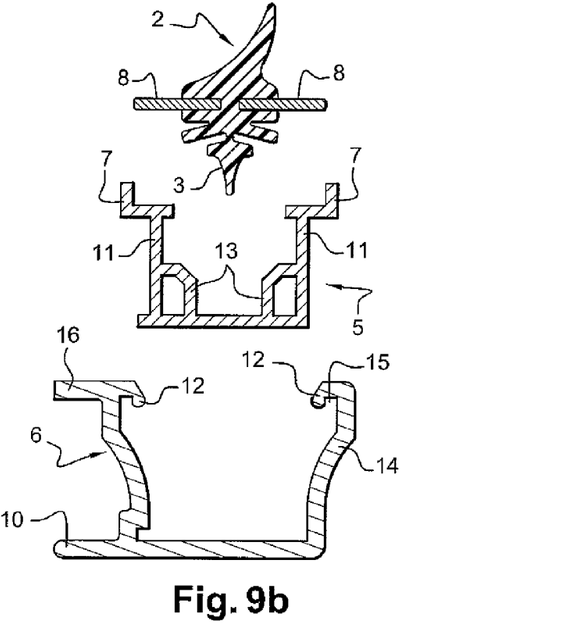
FIG. 9b shows an exploded view of FIG. 9a showing the assembly of the windscreen-wiper blade and the support device.
Figure 9C:
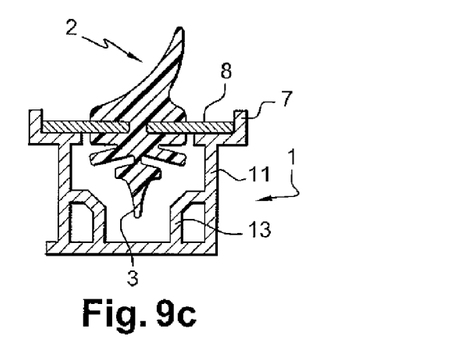
FIG. 9c shows a cross-section view of the support device, according to the axis c-c of FIG. 7, in which a second type of "flat-blade" windscreen-wiper blade is mounted.

FIGS. 8c and 9c show, on a cross-section view along line c-c of FIG. 7, the means 7 for positioning the windscreen-wiper blade 2 in the support device 1.

In FIG. 8c, the spine 8 rests on the top end of the lateral walls 11 of the rail 5.

In FIG. 9c, the spines 8 of the windscreen-wiper blade 2 rest on the lateral walls 11 of the rail 5 and are framed on their ends by the positioning means 7.

Figure 9D:
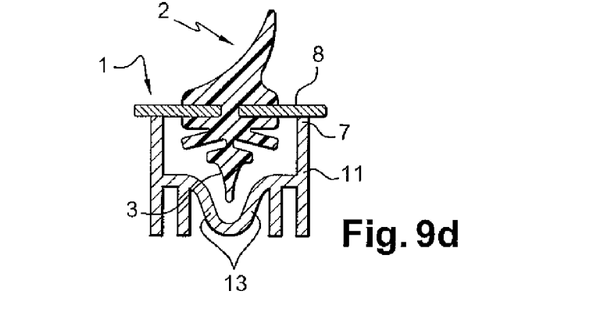
FIG. 9d shows a cross-section view of the support device, according to the axis c-c of FIG. 7, in which a second type of "flat-blade" windscreen-wiper blade according to another embodiment of the positioning means is mounted.

According to one possible alternative shown in FIG. 9d, the positioning means 7 can be made in a less expensive manner and consist merely of the lateral walls 11 of the rail 5. In this case, the positioning means 7, positioned according to the longitudinal axis of the rail 5, rest directly against the spines 8 of the windscreen-wiper blade 2 and participate in holding the windscreen-wiper blade flat in the support device 1 once the windscreen-wiper blade 2 is assembled. The positioning means 7 ensure the correct positioning of the windscreen-wiper blade 2 in the support device 1 preventing the windscreen-wiper blade 2 from twisting.

In FIG. 9d, another possible shape of the protection walls 13 of the wiping strip 3 is also shown. These protection walls 13 have, in general terms, the same technical characteristics as explained in detail above.

FIGS. 8b and 9b show, in a cross-section view along line a-a of FIG. 7 and in assembled position, the assembly of the attachment means 6 on the rail 5 and the insertion of the windscreen-wiper blade 2 in the rail 5 for the two models of windscreen-wiper blades shown above.

Assembly is then carried out as follows: once the rail 5 including the positioning means 7 is manufactured, the fastener 14, which is specific to the windscreen-wiper blade to be positioned in the support device, is locked onto the rail 5 and held in position by the complementary shapes and the retaining means 15.

This assembly forming the support device 1 is then ready to receive a windscreen-wiper blade.

The pressure exerted by the user when pressing on the windscreen-wiper blade 2 positioned above the open section 5a of the support device 1 is exerted against the clips 12, which deform slightly to allow the insertion of the windscreen-wiper blade 2 in the assembly. Once the windscreen-wiper blade 2 is in position in the support device 1, the clips 12 return to their initial position and hold the windscreen-wiper blade 2 in the open section 5a.

This assembly method is identical for traditional "flat-blade" windscreen-wiper blades (FIG. 9b) and for so-called economic "flat-blade" windscreen-wiper blades (FIG. 8b).

This embodiment of the invention makes it possible, in a highly optimised manner, to have a rail 5 and positioning means 7 that are common for all types of "flat-blade" windscreen-wiper blades, in particular, for example, those with or without a spoiler, and to adapt the locking means 14 to the relevant windscreen-wiper blade.

In the embodiment of the invention shown in FIG. 7, the positioning means are made by extrusion with the rail, but it is also possible to consider manufacturing them by injection with the rail and for the attachment means to be locking means designed to be mounted on the rail. Thus, regardless of the method used to manufacture the rail 5, it is possible, by adapting the shape of the positioning and attachment means to attach any type of "flat-blade" windscreen-wiper blades.

In order to further fully standardise the support device, in particular due to the different lengths of windscreen-wiper blades, it is recommended only to produce a limited number of devices with different lengths. Thus, in the case of windscreen-wiper blades with a length that is greater than that of the manufactured support device, it is the spines that rest against the rail at the level of the positioning means. On the other hand, for the windscreen-wiper blades in which the length is less than that of the produced support device, it is the end parts of the windscreen-wiper blades, also known as end clips, that rest against the rail at the level of the positioning means.

Figures 10, 11A, 11B:
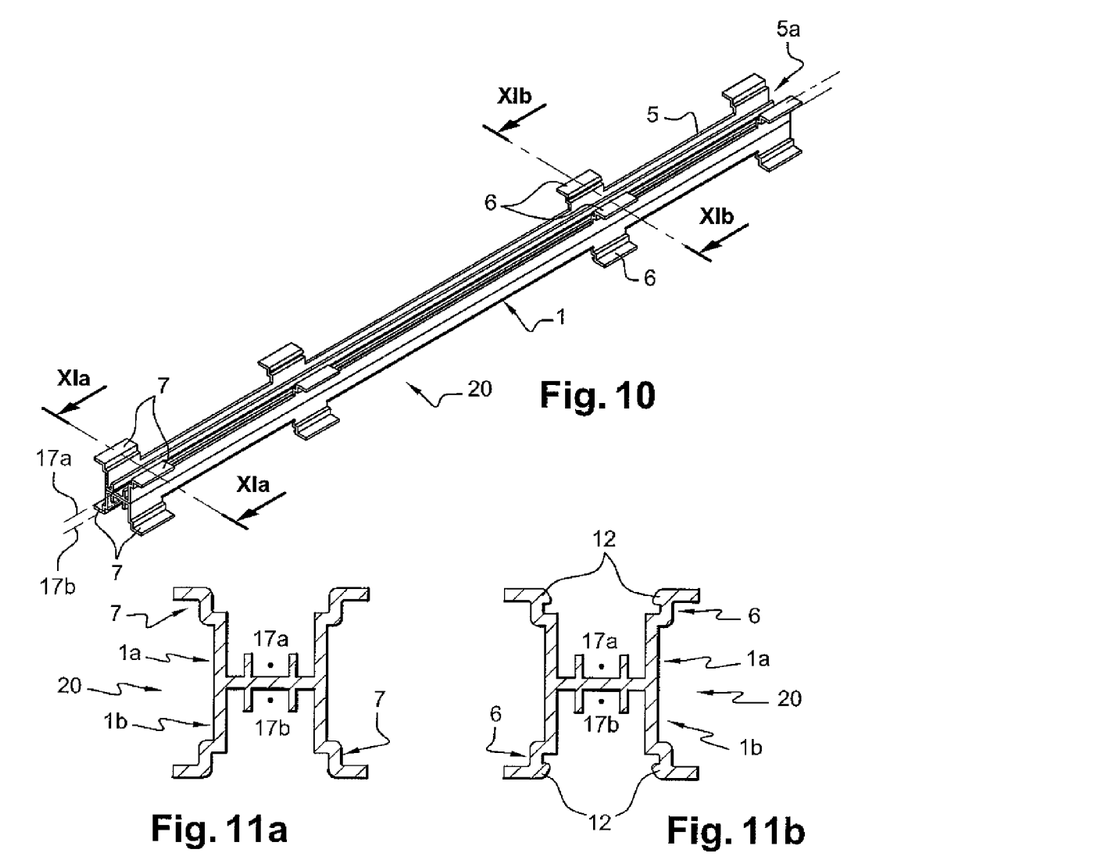
FIG. 10 shows a perspective view of a support assembly according to the invention in which two support devices are associated.
FIGS. 11a and 11b show cross-section views of the support device of FIG. 10, according to the axes XIa-XIa and XIb-XIb of FIG. 10.

FIGS. 10 and 11 relate to a support assembly 20 comprising two support devices as described above. In particular, FIGS. 11a and 11b are cross-section views along lines XIa-XIa and XIb-XIb of FIG. 10. The two devices 1a and 1b of the assembly 20 are arranged so that the open sections 5a of each of the devices are located opposite each other: one on the top of the assembly and the other on the bottom of the assembly.

The use of such an assembly is particularly interesting as it makes it possible to install two windscreen-wiper blades in an assembly with very small dimensions. For example, in the assembly 20, it is possible to support one windscreen-wiper blade for the driver side and one windscreen-wiper blade for the passenger side so as to form a kit aimed at users that want to replace both windscreen-wiper blades on their vehicle.

The assembly 20 can be made by injection or by extrusion using the aforementioned techniques, in which each of the support devices has one or more characteristics of the previously described support device 1.

In the assembly 20 presented in FIG. 10, the attachment means 6 and the positioning means 7 of the two support devices 1 are formed at the same level on each of the two devices. This is particularly clear in the cross-section views 11a and 11b.

Each of the support devices 1a and 1b comprises a median axis, 17a and 17b respectively, separating the support device into two parts longitudinally down the middle. According to a first shape of the assembly 20, the median axes 17a and 17b of the two support devices 1a and 1b are disposed on top of one another.

As described previously in the context of a single support device, the assembly equipped with two support devices comprises, at the level of each of the support devices 1a and 1b, a rail 5 comprising an open section 5a designed to receive a windscreen-wiper blade 2. The rail 5 comprises:
means 7 of positioning the windscreen-wiper blade 2 in the rail 5, and
means 6 of attaching the windscreen-wiper blade in the rail 5, the attachment means comprising clips 12 that ensure that at least one structure element of the windscreen-wiper blade is held in the rail 5.

In this example of an embodiment of the invention, the positioning means 7 and the attachment means are independent from each other.

The attachment means 6 are distributed on the support device and disposed on either side of the opening of the open section 5a of the rail 5. They act in pairs on the structure element of the windscreen-wiper blade when in place in the support device.

The positioning means 7 are also disposed on either side of the opening of the open section 5a of the rail 5 and they contribute in pairs to supporting the windscreen-wiper blade.

The various examples and embodiments of the rail 5, attachment means 6 and positioning means 7 described in the context of a single support device also apply to each of the support devices of the assembly 20.

Figure 12:
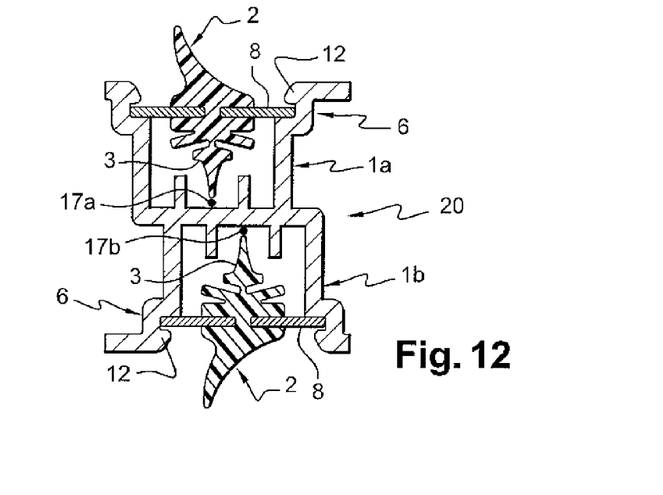
FIG. 12 shows a cross-section view of a support assembly according to the invention in which two support devices are associated in a staggered formation.

One possible alternative construction of the assembly 20 is shown in FIG. 12. In this cross-section view, at the level of the attachment means 6, the median axes 17a and 17b of the two support devices 1a and 1b are staggered; the centre distance of the two windscreen-wiper blades when positioned is staggered. This arrangement prevents, in the case of the windscreen-wiper blades being particularly long, their ends from touching (due to the flexibility of the windscreen-wiper blade spines) and the wiping strips 3 from being damaged.

Figure 13A:
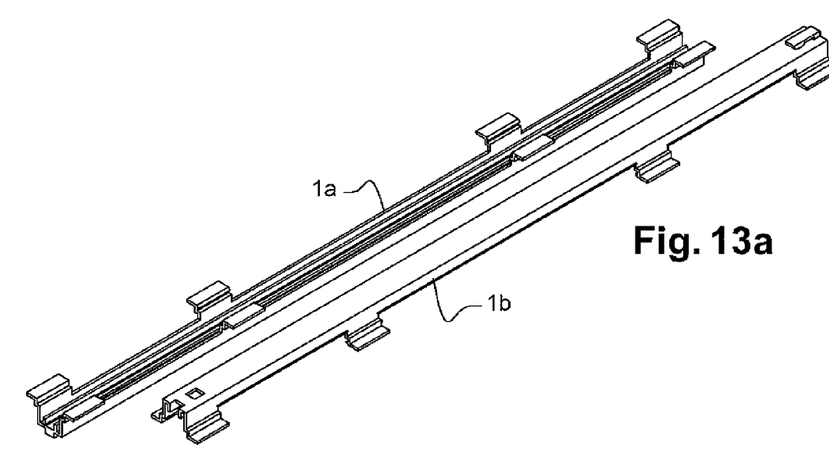
FIGS. 13a, 13b and 13c show perspective views relating to the assembly of two support devices in a support assembly.
Figure 13B:
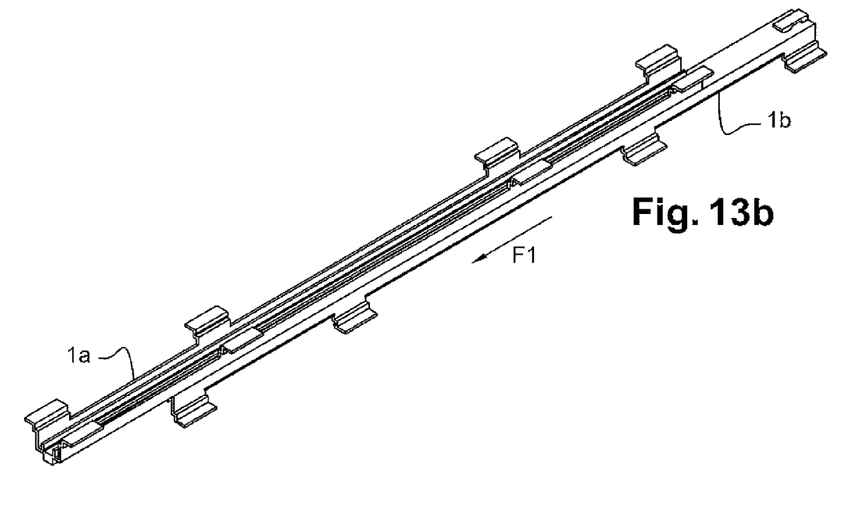
Figures 13C, 14A, 14B, 15:
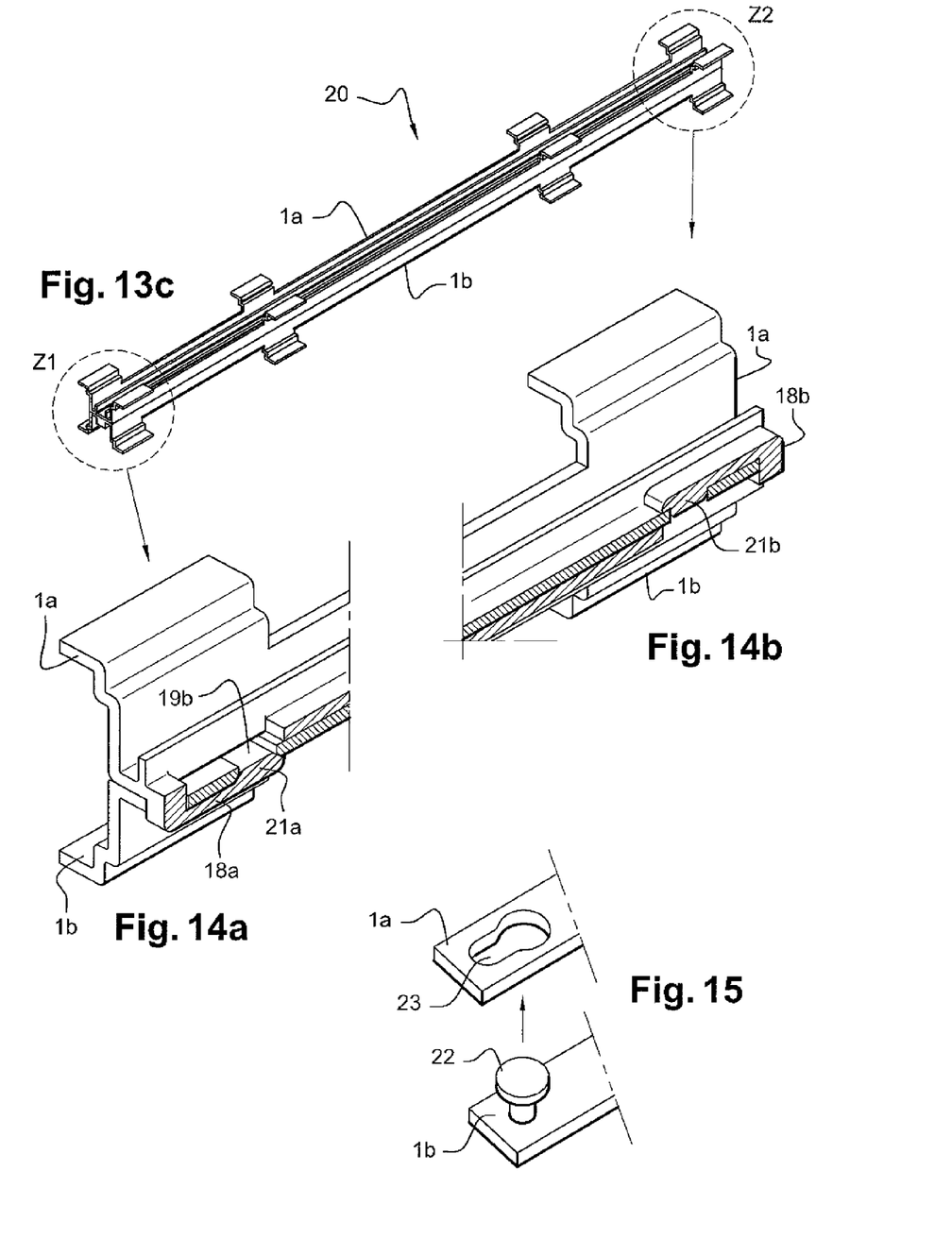
FIGS. 14a and 14b show detailed views of a possible embodiment of the assembly means of the two support devices shown in FIG. 13c.
FIG. 15 shows a schematic view of the assembly of two buttonhole support devices.

FIGS. 13a to 13c show the assembly of two distinct support devices 1a and 1b in an assembly 20 for supporting two windscreen-wiper blades.

Assembly is carried out as follows:

Head-to-tail presentation of the support devices on top of one another in a longitudinally staggered fashion and Clipping of the support devices by sliding in the direction of the arrow F1.

The devices are clipped to each other, in the example shown, by a lug/notch system, each support assembly comprising an elastic tab 21 having a lug 18 and a notch 19.

The support device 1a and 1b respectively, comprises an elastic tab 21a and 21b respectively, having a lug 18a and 18b respectively, and a notch 11a and 19b respectively.

The lug/notch assembly is shown in detail in FIGS. 14a and 14b, which are respectively enlarged longitudinal cross-section views of zones z1 and z2. Thus, when the two support devices are assembled, the lug 18a of the support device 1a is associated with the notch 19b of the support device 1b and, in a similar fashion, the lug 18b of the support device 1b is associated with the notch 19a of the support device 1a.

The two support devices can be connected to each other by one or more lug/notch assemblies disposed along the device according to the length of the support devices.

Furthermore, as required, it is possible to assemble two support devices with different lengths. This is advantageous when making windscreen-wiper blade replacement kits, since the driver and passenger blades often have different lengths.

FIG. 15 shows another assembly system using a buttonhole system 22 with a complementary opening 23 between the two support devices.

The previously described invention has numerous advantages, in particular the fact that it allows the windscreen-wiper blade to be held flat in a device of reduced size.

In general terms, it is possible to distinguish between problems relating to the supply of products for first installation aimed at car manufacturers and to the supply of spare parts.

Thus, when the windscreen-wiper blade is intended for car manufacturer plants with a view to being assembled on a vehicle, the support device supporting the windscreen-wiper blade can be packaged in a stable manner with reduced dimensions in the storage boxes, allowing a smaller volume per delivery. The design of the support device allows the windscreen-wiper blade to be installed, equipped with its support device, in a very simple manner on the windscreen-wiper arm. In this case, the support device can be recycled for transporting further windscreen-wiper blades.

On the other hand, when the windscreen-wiper arm is intended for the spare parts market, the support device supporting the windscreen-wiper arm is then placed in packaging with a view to presenting it on shelves.

This packaging can be made in the form of a blister pack, a bag or a cardboard support with dimensions that are entirely compatible with current environmental restrictions. It is then possible, thanks to the support device according to the invention, to design packaging with reduced bulk.

The use of a blister pack will be highly appreciated by the user, who will be able to see the windscreen-wiper blade and make sure that the connector it contains is suitable for the windscreen-wiper arms installed on his/her vehicle. In any case, there is no interaction between the support device and the windscreen-wiper blade connector.

In a very ingenious manner, the rail 5 can have, on one of its ends, an appendage comprising a European hole (standardised opening for shelf display) allowing the assembly of the device equipped with its windscreen wiper to be hung on the distribution shelves. This appendage is, for example, formed integral with the rail.

Thus, this new support device allows the packaging, individual or as a kit in a support assembly, and the transport of windscreen-wiper blades, in particular of "flat-blade" type, to the end customer while considerably reducing the bulk of the windscreen-wiper blades.

The use of a support device or assembly such as presented makes it possible to support the windscreen-wiper blade or blades with minimum bulk and considerably to reduce the packaging reference number.

In addition, this device provides protection of the strip until the windscreen-wiper blade is used, preventing it from being damaged and deformed.

It should also be noted that the end customer can reuse the device for other purposes. Thus, for example, the stabilisation means of the support device can be used as an ice scraper when the windscreen-wiper blades are operational and the support device has been removed. The stabilisation means, generally centred at the level of the support device, can be smooth or toothed depending on the desired end use.

According to another example, the support device can also act as a strip protector, in particular during the winter, for a vehicle in long-term parking, preventing the wiping strip from sticking to the windscreen. For this purpose, when planning to park for a long period, the support device is mounted on the windscreen-wiper arm connected to the windscreen-wiper arm of the car.

Furthermore, depending on the dimensions of the windscreen-wiper blade, it is possible to change the length of the support device, and to add the number of attachment clips required for effectively supporting the windscreen-wiper blade.

In all the embodiments of the invention shown and for reasons of clarity, the attachment means and the positioning means are presented in limited numbers, but the number of them and their spacing can be adapted to the length of the windscreen-wiper blade to be supported in the support device.

The present invention is described in the context of a "flat-blade" windscreen-wiper blade, but can also apply to spring-blade windscreen-wiper blades which have a considerably curved structure or even to windscreen-wiper blades with a traditional structure using a compensator, for which it is desirable to reduce the amount of packaging used.

The invention claimed is:

1. An apparatus comprising:
   a windscreen-wiper blade including a wiping strip, the windscreen-wiper blade comprises a connector configured to facilitate a connection of the windscreen-wiper blade to a windscreen-wiper arm;
   a structure element disposed along a length of the windscreen-wiper blade;
   a support device comprising an open section configured to receive the wiping strip and protection means extending into the open section configured to protect the wiping strip;
   at least two positioning means for positioning the windscreen-wiper blade in the support device; and
   at least two attachment means, each attachment means comprising an attachment point acting on the structure element of the windscreen-wiper blade for attaching the windscreen-wiper blade to the support device, wherein, when the windscreen-wiper blade is attached to the support device, the windscreen-wiper blade is substantially flat and wherein, when mounting the windscreen-wiper blade on the support device, at least one attachment means and at least one positioning means are disposed on each side of the connector.

2. The apparatus according to claim 1, wherein the support device comprises a plurality of attachment points distributed along the support device.

3. The apparatus according to claim 2, wherein the plurality of attachment points are disposed as pairs on either side of an opening of the open section and engage the structure element of the windscreen-wiper blade.

4. The apparatus according to claim 2, wherein the attachment points of the windscreen-wiper blade are disposed on either side of the connector in a longitudinal direction of the windscreen-wiper blade.

5. The apparatus according to claim 4, wherein the support device comprises an alternation of positioning means and attachments means on either side of the connector.

6. The apparatus according to claim 1, wherein the structure element comprises at least one spine, and wherein the at least one attachment point acts on the spine.

7. The apparatus according to claim 1, wherein the positioning means is disposed on either side of an opening of the open section of the support device and supports the windscreen-wiper blade while the windscreen-wiper blade is positioned.

8. The apparatus according to claim 1, wherein the support device comprises a rail extending longitudinally, wherein the positioning means and the attachment means are formed integral with the rail.

9. The apparatus according to claim 8, wherein the rail is formed by plastic injection.

10. The apparatus according to claim 8, further comprising means for stabilizing the support device on a flat surface, the stabilizing means disposed on at least one outer side of the open section of the support device.

11. The apparatus according to claim 10, wherein the stabilization means are integral with the rail of the support device.

12. The apparatus according to claim 10, wherein the attachment means support the stabilization means.

13. The apparatus according to claim 1, wherein the support device comprises a rail extending longitudinally, and wherein the rail is manufactured by extrusion.

14. The apparatus according to claim 13, wherein the positioning means are manufactured by extrusion with the rail, and wherein the attachment means comprises locking means configured to be mounted on the rail.

15. The apparatus according to claim 14, wherein the locking means comprises at least one unclipping tab to facilitate removal of the windscreen-wiper blade when the windscreen-wiper blade is accommodated in the support device.

16. The apparatus according to claim 1, wherein the positioning means is disposed at each end of the support device.

17. A support assembly comprising:
a first apparatus according to claim 1, and
a second apparatus according to claim 1.

18. The support assembly according to claim 17, further comprising:
on the first support apparatus, first assembly means disposed opposite an opening of the open section and cooperating with second assembly means disposed opposite an opening of the open section of the second support apparatus.

19. The support assembly according to claim 18, wherein the first and second assembly means comprise a lug/notch pair.

20. The support assembly according to claim 18, wherein the first and second assembly means cooperate by means of a buttonhole system.

21. The support assembly according to claim 17, wherein each of the first and second apparatuses comprise a median axis in a longitudinal direction of the windscreen-wiper blade, and wherein the median axes of the two apparatuses, once assembled, are staggered in relation to each other.

22. A method of mounting an apparatus according to claim 1, comprising:
positioning the windscreen-wiper blade above the open section of the support device; and
exerting pressure on the windscreen-wiper blade parallel to the attachment means to allow the insertion and support of the windscreen-wiper blade in the open section of the support device.

23. The apparatus according to claim 1, wherein each of the attachment points protrudes outwardly and away from a center of the support device.

* * * * *